(12) United States Patent
Flettner et al.

(10) Patent No.: US 11,309,960 B2
(45) Date of Patent: Apr. 19, 2022

(54) MEASURING LINEAR AND NON-LINEAR TRANSMISSION PERTURBATIONS IN OPTICAL TRANSMISSION SYSTEMS

(71) Applicant: VIAVI SOLUTIONS INC., San Jose, CA (US)

(72) Inventors: Axel Flettner, Bondorf (DE); Eberhard Lothar Loecklin, Reutlingen (DE); Wolfgang Moench, Neuffen (DE)

(73) Assignee: VIAVI SOLUTIONS INC., San Jose, CA (US)

( * ) Notice: Subject to any disclaimer, the term of this patent is extended or adjusted under 35 U.S.C. 154(b) by 0 days.

(21) Appl. No.: 16/915,653

(22) Filed: Jun. 29, 2020

(65) Prior Publication Data
US 2020/0412448 A1    Dec. 31, 2020

Related U.S. Application Data

(60) Provisional application No. 62/869,896, filed on Jul. 2, 2019, provisional application No. 62/867,635, filed on Jun. 27, 2019.

(51) Int. Cl.
*H04B 10/07* (2013.01)
*H04B 10/079* (2013.01)
(Continued)

(52) U.S. Cl.
CPC . *H04B 10/07953* (2013.01); *H04B 10/07955* (2013.01); *H04B 10/2543* (2013.01);
(Continued)

(58) Field of Classification Search
CPC ........ H04B 10/07953; H04B 10/07955; H04B 10/2543; H04B 10/40; H04B 10/07; H04J 14/0227; H04J 14/02; G01M 11/30
(Continued)

(56) References Cited

U.S. PATENT DOCUMENTS

| 7,542,674 B1 * | 6/2009 | Barozzi | H04B 10/0795 |
| | | | 398/16 |
| 9,112,604 B2 * | 8/2015 | Gariepy | H04B 10/07953 |

(Continued)

FOREIGN PATENT DOCUMENTS

| EP | 2569879 | 3/2013 |
| WO | 2018/197975 | 11/2018 |

OTHER PUBLICATIONS

Moench et al, Measurement of Optical Signal to Noise Ratio in Coherent Systems, Mar. 2017, OFC, Th2A.42.pdf, All Document. (Year: 2017).*

(Continued)

*Primary Examiner* — Dibson J Sanchez
(74) *Attorney, Agent, or Firm* — Mannava & Kang, P.C.

(57) ABSTRACT

A system for measuring linear and non-linear transmission perturbations in optical transmission systems is disclosed. The system may include a processor to help facilitate measurement of non-linear noise at an optical transceiver. The system, for example, may receive a reference correlation of a transmission of a channel of a fiber link, record an optical power spectrum of the channel, and determine a baud rate of the channel. The system may also apply a spectral correlation technique to the channel with a multiple baud rate distance in frequency domain. The system may also calculate a generalized optical signal-to-noise ratio (gOSNR) value based on the spectral correlation technique and the reference correlation. The system may also compare the gOSNR with wavelength division multiplexed (WDM) OSNR measurements to evaluate an amount of non-linear noise contributions.

18 Claims, 8 Drawing Sheets

(51) Int. Cl.
*H04B 10/2543* (2013.01)
*H04J 14/02* (2006.01)
*G01M 11/00* (2006.01)

(52) U.S. Cl.
CPC ......... *H04J 14/0227* (2013.01); *G01M 11/30* (2013.01); *H04B 10/07* (2013.01); *H04J 14/02* (2013.01)

(58) Field of Classification Search
USPC .......................................... 398/9–38, 43–103
See application file for complete search history.

(56) References Cited

U.S. PATENT DOCUMENTS

| | | | | |
|---|---|---|---|---|
| 10,211,917 | B1* | 2/2019 | Wang | H04B 10/541 |
| 10,567,075 | B2* | 2/2020 | Tyagi | H04B 10/0793 |
| 2009/0254317 | A1* | 10/2009 | Grigoryan | G06F 30/3323 |
| | | | | 703/2 |
| 2015/0117853 | A1* | 4/2015 | Zhang | H04B 10/0791 |
| | | | | 398/20 |
| 2015/0304035 | A1* | 10/2015 | Nijhof | H04J 14/0221 |
| | | | | 398/26 |
| 2015/0330835 | A1* | 11/2015 | Yamauchi | G01J 1/44 |
| | | | | 250/214 C |
| 2015/0333825 | A1* | 11/2015 | Kim | H04B 10/07953 |
| | | | | 398/26 |
| 2016/0127074 | A1* | 5/2016 | He | H04B 10/0775 |
| | | | | 398/26 |
| 2016/0164599 | A1* | 6/2016 | Heismann | H04B 10/07955 |
| | | | | 398/26 |
| 2016/0226582 | A1* | 8/2016 | Oyama | H04B 10/0775 |
| 2017/0078017 | A1* | 3/2017 | Dahan | H04B 10/6162 |
| 2017/0302372 | A1* | 10/2017 | Yamauchi | H04B 10/07957 |
| 2018/0006715 | A1* | 1/2018 | Tyagi | H04B 10/0791 |
| 2018/0219622 | A1* | 8/2018 | Wang | H04B 10/07955 |
| 2018/0269968 | A1* | 9/2018 | Zhuge | G06N 20/00 |
| 2019/0305845 | A1* | 10/2019 | Cyr | H04B 10/07953 |
| 2020/0106523 | A1* | 4/2020 | Zhang | H04B 10/0775 |
| 2020/0112367 | A1* | 4/2020 | Huang | G06N 3/08 |
| 2020/0328807 | A1* | 10/2020 | Jiang | H04B 10/40 |

OTHER PUBLICATIONS

Fosco, Modulation Formats for 100G and beyond, Jan. 2014, All Document. https://www.fiberoptics4sale.com/blogs/archive-posts/95041158-modulation-formats-for-100g-and-beyond (Year: 2014).*
Berg, Demystifying Transceiver and Line Characterization Metrics, Mar. 2019, OFC, paper W4H.3, All Document. (Year: 2019).*
Peter Winterling: "Spektral korrelieren-Optische Spektrumanalyse an koharenten Ubertragungssystemen von 100-Gigabit-Ethernet und hoher", Net Zeitschrift Fur Kommunikationsmanagement, No. 3, Mar. 1, 2019, pp. 26-29. (With machine English translation).
Wolfgang Grupp et al., "In-band OSNR Measurement based on Spectral Correlation", May 3, 2010.

* cited by examiner

MEASURING LINEAR AND NON-LINEAR TRANSMISSION PERTURBATIONS IN OPTICAL TRANSMISSION SYSTEMS

PRIORITY

This patent application claims priority to U.S. Provisional Application No. 62/867,635, filed Jun. 27, 2019, and U.S. Provisional Application No. 62/869,896, filed Jul. 2, 2019, which are hereby incorporated by reference in their entireties.

TECHNICAL FIELD

This patent application is directed to optical test and measurement in telecommunication networks, and more specifically, to measuring linear and non-linear transmission perturbations in optical transmission systems.

BRIEF DESCRIPTION OF DRAWINGS

Features of the present disclosure are illustrated by way of example and not limited in the following Figure(s), in which like numerals indicate like elements, in which.

DESCRIPTION

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

The quality of modulated optical signals transmitted in long-distance fiber-optic communications is frequently characterized by optical signal-to-noise ratio (OSNR), which may define a ratio of the total optical power of digital information signal to optical noise added to the signal by optical amplifiers. In communications with only a few widely-spaced wavelength-multiplexed signals, OSNR may be readily determined by spectral analysis of a transmitted noisy signal and the optical noise floor on either side of the signal spectrum. In modern optical communication systems with dense wavelength-division multiplexing (DWDM), various transmitted optical signals are closely spaced in optical frequency, so that it becomes difficult to measure optical noise floor between adjacent signal spectra. This may be of particular concern for communication systems transmitting optical signals at bit rates of 100 Gb/s over 50-GHz wide wavelength channels. In these systems, measuring the optical noise floor within the spectral bandwidth of the signal may be needed to determine the signal's OSNR. Such measurements may be commonly referred to as in-band OSNR. Furthermore, it may be frequently required that these in-band OSNR measurements are performed while the communication is in service, i.e., that the noise floor within the signal's bandwidth is determined while the optical information signal is transmitted. There may be many challenges posed by these requirements.

One way that these challenges may be addressed is via spectral correlation techniques, as described in U.S. Pat. No. 9,825,698 to Heismann, entitled "Determining In-Band Optical Signal-to-Noise Ratio In Polarization-Multiplexed Optical Signals Using Signal Correlations," filed Dec. 9, 2014, which is incorporated by reference herein in its entirety.

With telecommunication providers looking to drive network performance as bandwidth demands from customers continue to increase, many approaches have been developed to help to overcome any such bandwidth shortfall. For instance, with Nyquist-shaped signals, it may be possible to go to higher modulations-formats, keeping bandwidth boundary conditions and by simultaneously increasing the power levels, to transmit signals even over longer distances. However, it should be appreciated that non-linear distortions have been identified as one of the main limitations in long haul coherent optical systems leading to additional system restrictions and problems.

To address these and other similar technical problems, knowledge about the amount of each distortion may be acquired and used to tune system performance to an optimum where the trade-off between performance and stability can be met. While linear noise may be directly measured and expressed as OSNR using an optical spectrum analyzer (OSA), there is currently no reliable system or method to directly assess non-linear signal degradations or perturbations in optical transmission systems.

An optical spectrum analyzer (OSA) may employ a spectral correlation technique, for example and as described above, on polarization multiplexed signals for calculating the OSNR from a carrier in a coherent system. The spectral correlation technique used may be separated by a baud rate in the frequency domain. If the power-levels reach the non-linear threshold of a fiberspan additional physical effects may arise and may need to be considered when characterizing OSNR because the noise-floor may consist of extra contributions coming from non-linear perturbations, as shown by the following expressions:

$$N_{total} = N_{ASE} + N_{NL}$$

$$OSNR_{tot} = \frac{S_{tot}}{N_{tot}} = \frac{S_{tot}}{N_{ASE} + N_{NL}},$$

where NL=non-linear, ASE=amplified spontaneous emission.

The nature of non-linear effects may appear random but may generally follow a Gaussian distribution. This may explain why non-linear noise components are not typically correlated to each other. Thus, by probing the two signal frequency components of the spectrum, a test instrument may instantly understand or measure the underlying noise components at these frequencies as well. When the uncorrelated noise components increase due to non-linearities, the correlation of the signal components may be immediately disturbed and decreased. Decreasing signal correlation may imply causally determined increasing noise components. This relationship may be directly measured using the techniques described herein.

In some examples, a bit error tester may be used as a reference. In particular, this may be achieved by looking at the bit error ratio (BER) and by counting transmitted bytes encrypted with a forward error correction (FEC) algorithm or technique divided by the amount of bytes which had to be corrected at the receiver side, as shown in the expression below:

$$BER = \frac{\sum [\text{corrected-bits}]}{\sum [\text{transmitted-bits}]}$$

Figure 1:
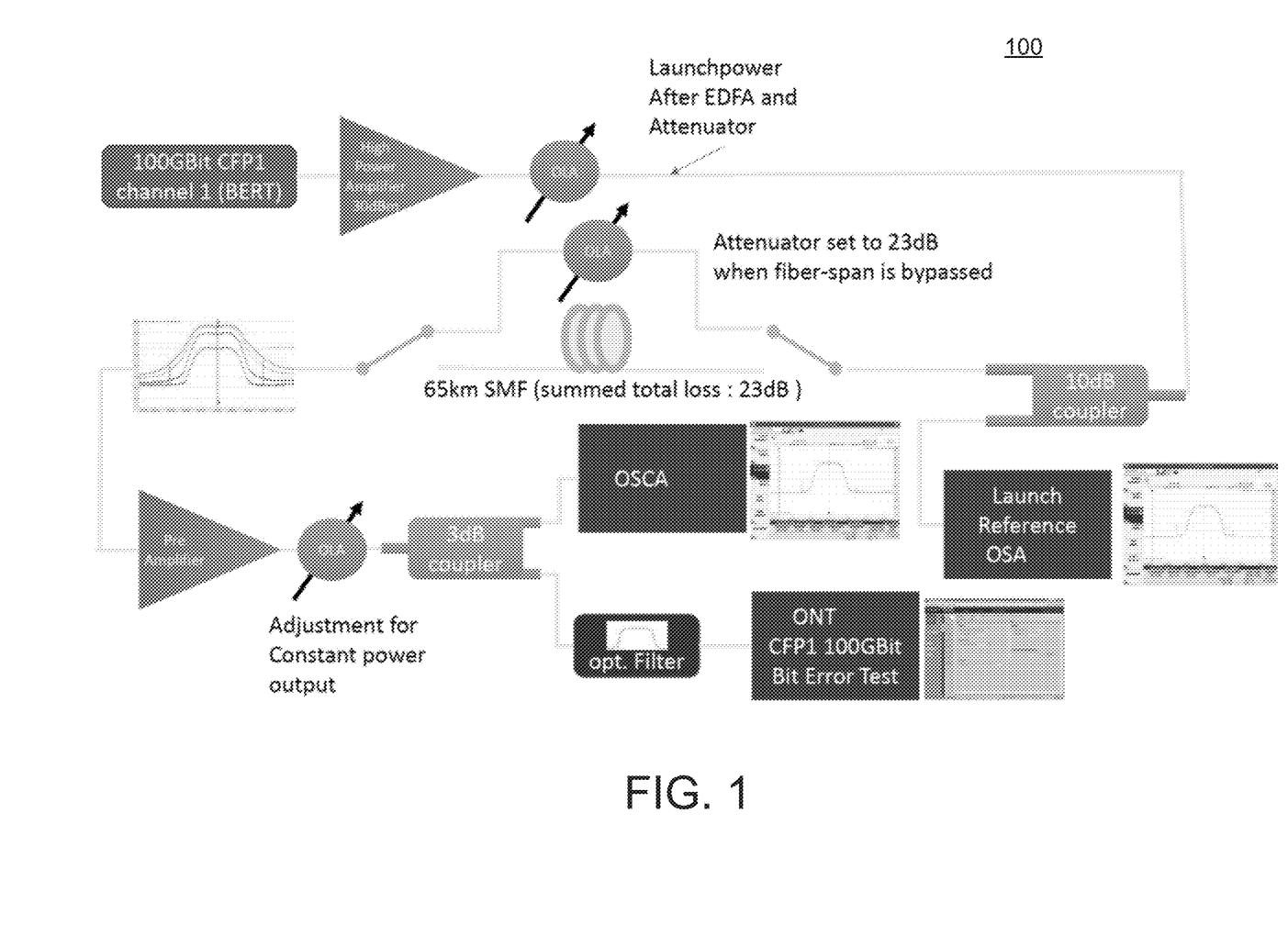
FIG. 1 illustrates a system for measuring linear and non-linear transmission perturbations in an exemplary setup with either a 65 km single-mode optical fiber (SMF) link or a direct connection, according to an example.

FIG. 1 illustrates a system 100 for measuring linear and non-linear transmission perturbations in an exemplary setup, e.g., with either a 65 km single-mode optical fiber (SMF) link or a direct connection, according to an example. As shown, the generated traffic with forward error correction (FEC) may encounter a first amplification stage, which may be used to set a launchpower and may boost the signal, e.g., to a max 30 dBm or other level. After this first booster (e.g., Erbium-doped fiber amplifier (EDFA)), a part of the signal may be coupled out to monitor the launchpower with an OSA. The signal may then be routed either through a 65 km fiber link or bypassed with an optical power level attenuator (OLA), which may be set up to exactly the same (or similar) insertion loss as the link.

In the next step, a final amplification stage may be introduced for pre-amplifying the signal right before an optical spectrum and correlation analyzer (OSCA) in order to maintain a constant power level with another OLA at the receiver side. At this point, the signal may be evenly split into two parts, one going directly to the OSCA and the other returning to the ONT running through an optical filter to avoid cross-talk finally reaching the bit error rate tester. All or most of the data from OSA, OSCA, and/or ONT may be recorded, stored, and used for analysis. It should be appreciated that the OSNR of the signal may be set to 24 dB (or other level) and the reference correlation may be obtained at the transmitter side (or other location). Other various examples or alternatives may also be provided.

Figure 2:
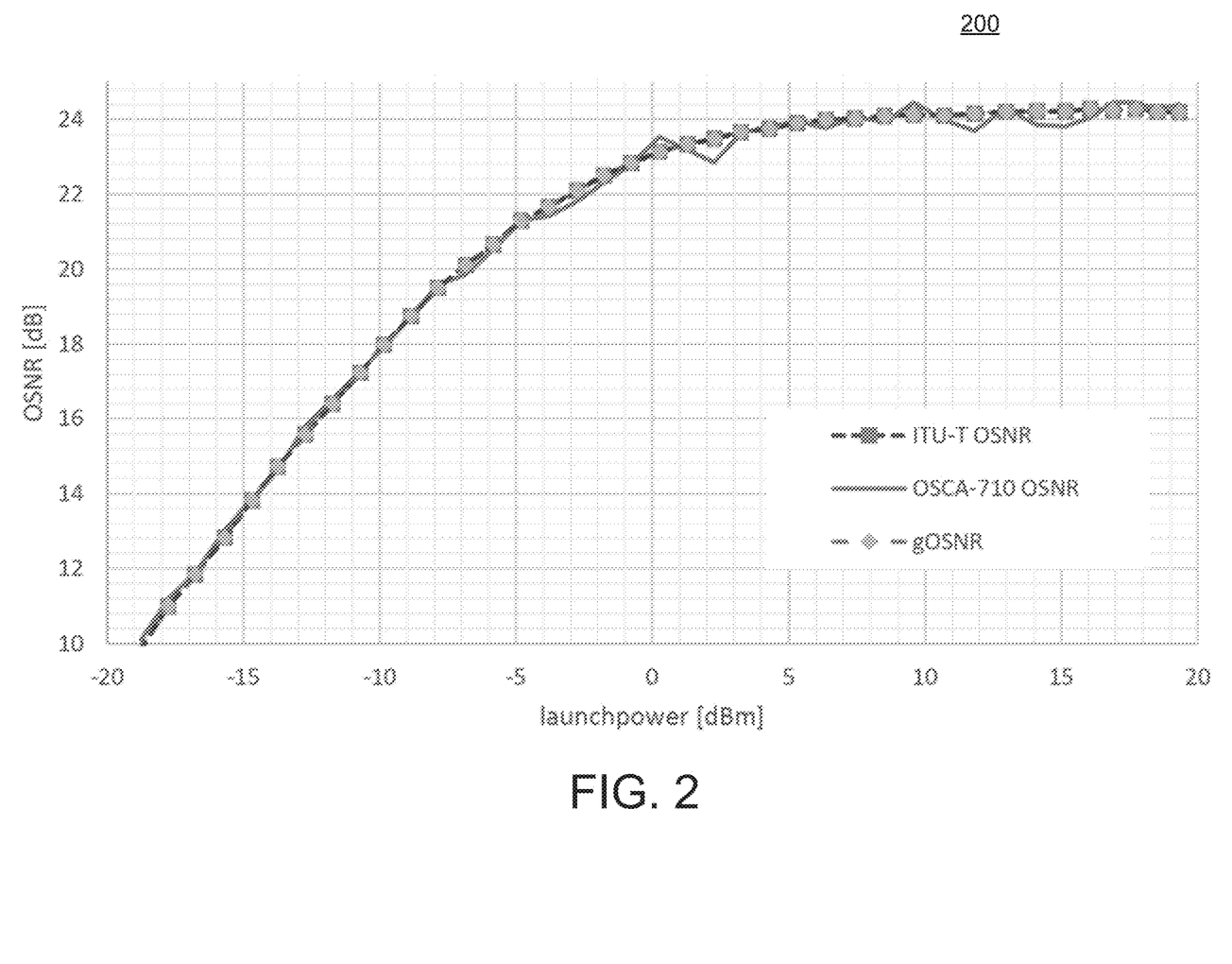
FIG. 2 illustrates a graph depicting optical signal-to-noise ratio (OSNR) versus launchpower in a direct setup, according to an example.

FIG. 2 illustrates a graph 200 depicting OSNR versus launchpower in a direct setup, according to an example. In some examples, the measurement without the 65 km SMF link may be considered to be a reference. The OSNR versus launchpower may be recorded as well as the bit error ratio versus OSNR, as shown. It should be appreciated that a compliant OSNR measurement may be the same as or similar to the OSNR measured with the OSCA. In some examples, both curves may follow a true theoretical generalized OSNR (gOSNR) line because no non-linearities may be present respectively and the signal power threshold may not be met.

Figure 3:
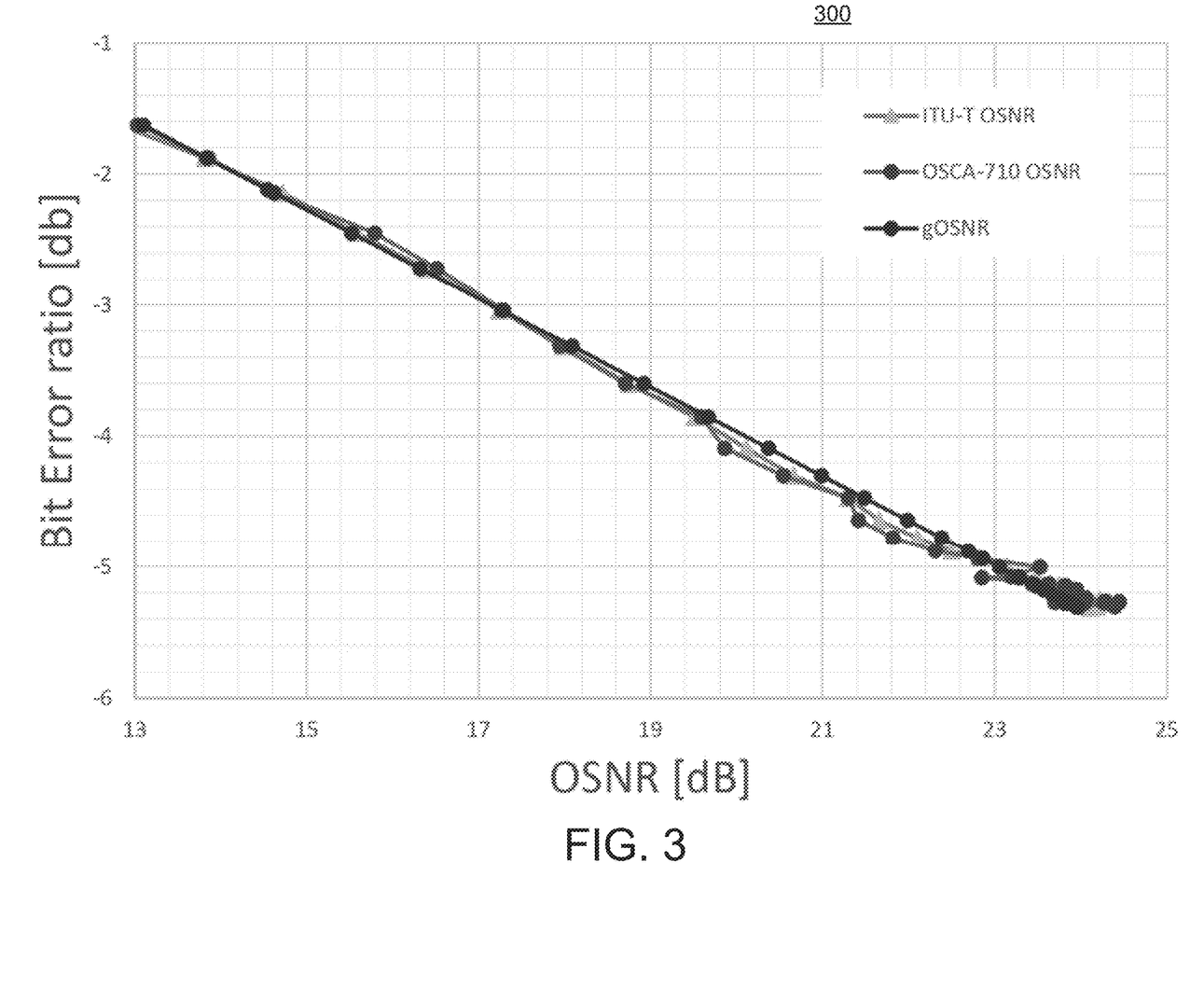
FIG. 3 illustrates a graph depicting bit error ratio (BER) versus optical signal-to-noise ratio (OSNR) in a direct setup, according to an example.
Figure 4:
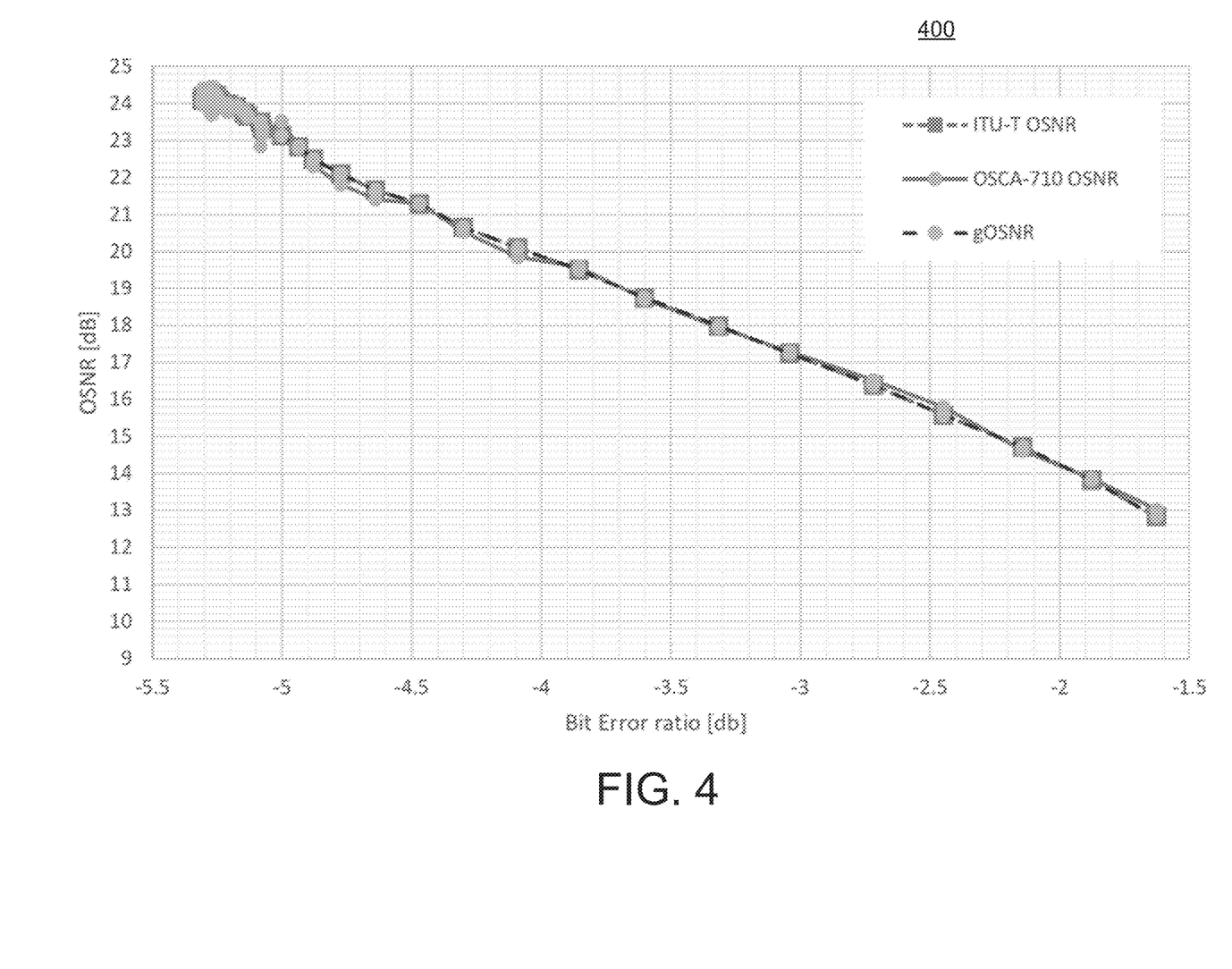
FIG. 4 illustrates a graph depicting optical signal-to-noise ratio (OSNR) versus bit error ratio (BER) in a direct setup, according to an example.

FIG. 3 illustrates a graph 300 depicting bit error ratio (BER) versus OSNR in a direct setup, according to an example. It should be appreciated that a straight line, as shown, may indicate that a lower OSNR corresponds to a higher bit error ratio and vice-versa. FIG. 4 illustrates a graph 400 depicting OSNR versus bit error ratio (BER). FIG. 4 is similar to FIG. 3, but the x- and y-axes are swapped. In this way, the graph 400 may more readily depict an OSNR value dependent on the bit error ratio in a direct setup.

When the signal is travelling over longer distances at certain power-levels, there may be non-linear effects, similar to self-phase-modulation, cross-phase-modulation, or four-wave mixing, etc., that may interfere with original signal components. This may lead to a degradation of the OSNR and as well as in the bit error ratio (BER). It should be appreciated that if the power-levels rise over a certain threshold value and the interaction time (fiber length) is long enough, the non-linearities may contribute to common noise-floor inside the channel, modifying the original OSNR. Standard techniques, which may not be sensitive to inter-channel effects, cannot generally recognize the enlarged noise-floor and therefore the lower gOSNR.

Figure 5:
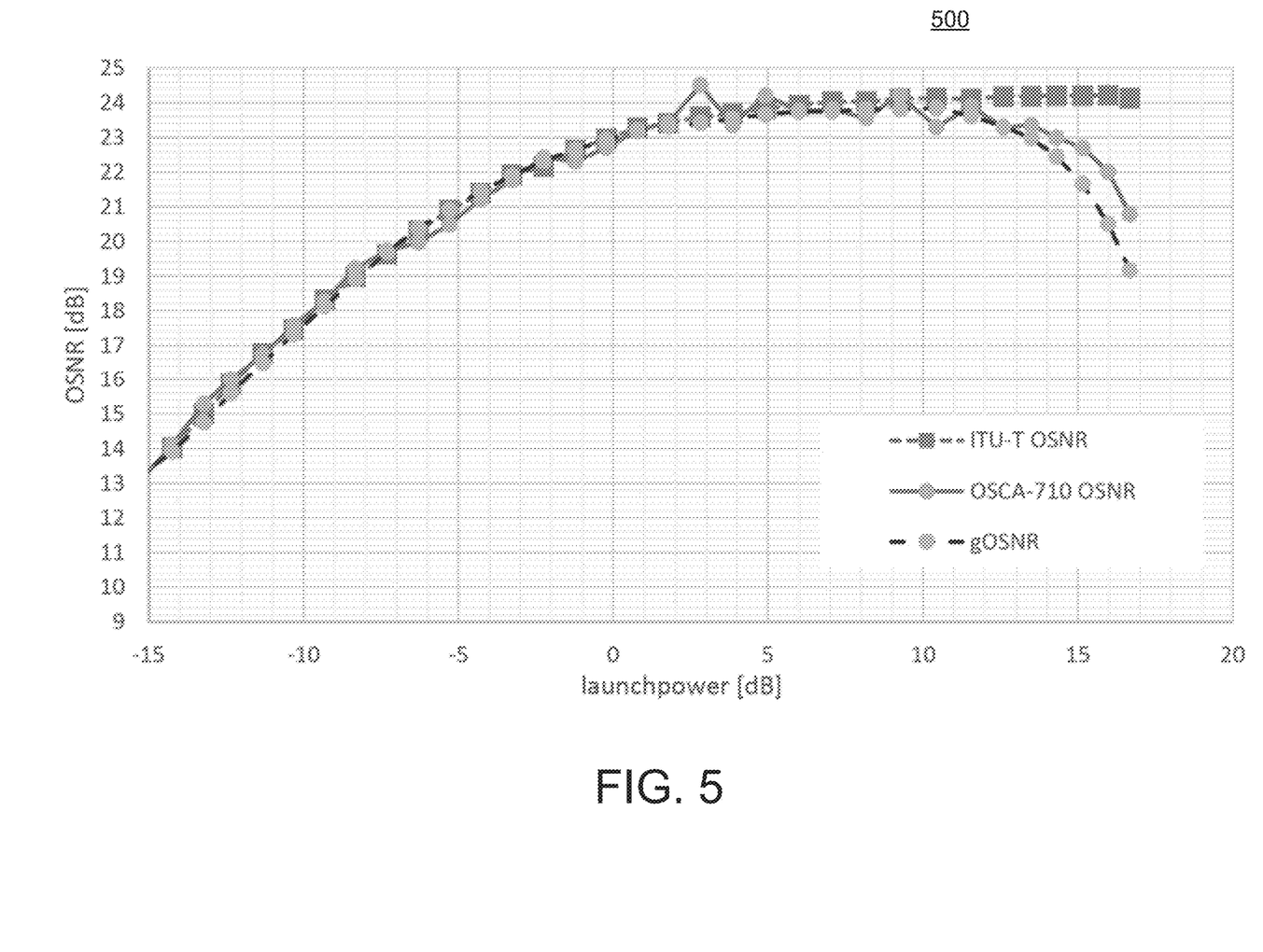
FIG. 5 illustrates a graph depicting optical signal-to-noise ratio (OSNR) versus launchpower in a setup with 65 km single-mode optical fiber (SMF), according to an example.
Figure 6:
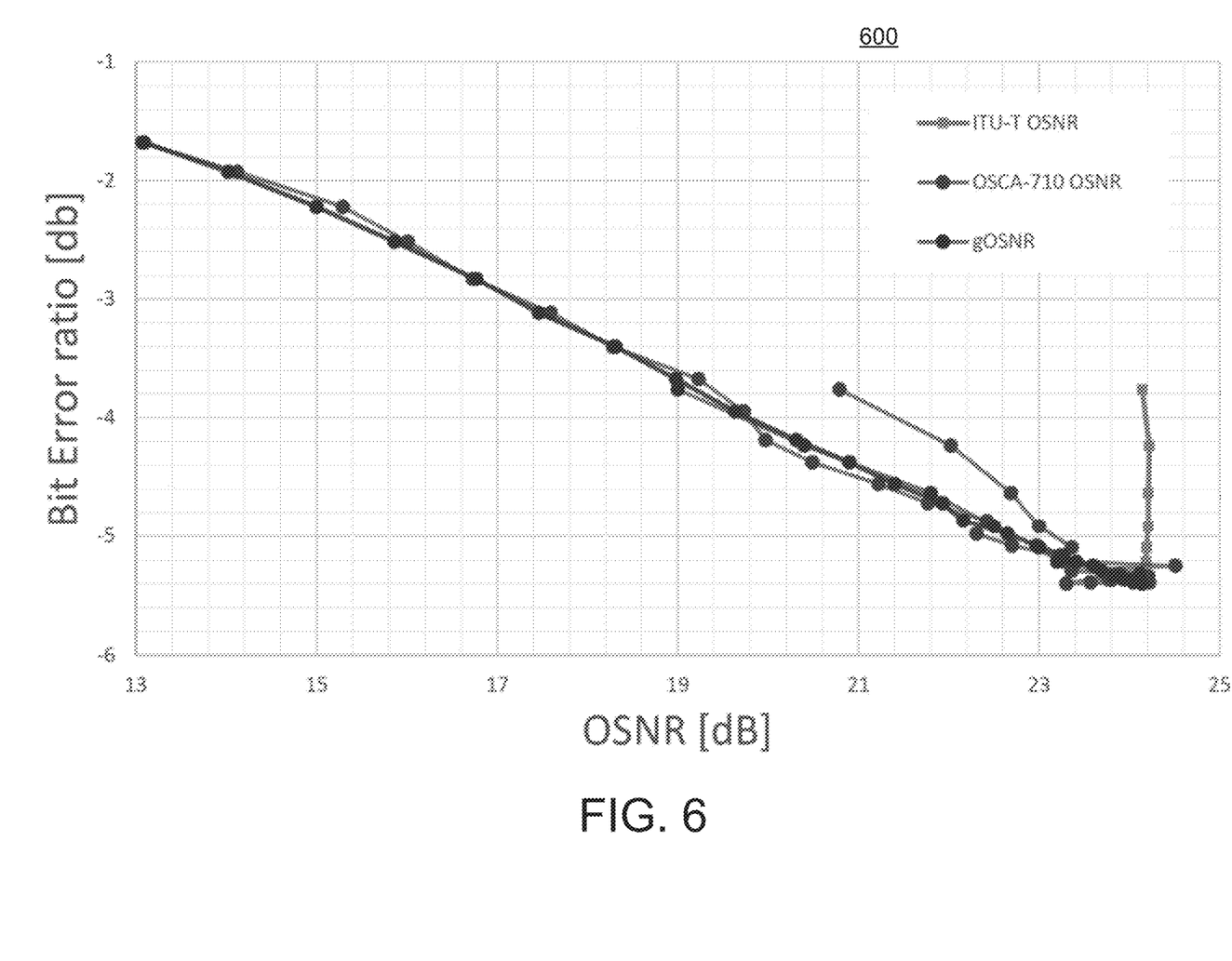
FIG. 6 illustrates a graph depicting bit error ratio (BER) versus optical signal-to-noise ratio (OSNR) in a setup with 65 km single-mode optical fiber (SMF), according to an example.

In other words, an ITU-T OSNR may show an incorrect OSNR value at high launchpowers because of disobeying the intra-channel non-linear noise contributions. FIG. 5, for example, illustrates a graph 500 depicting OSNR versus launchpower in a setup with 65 km single-mode optical fiber (SMF), according to an example. Whereas the spectral correlation of the OSCA may be directly influenced by non-linearities and will measure a correct gOSNR at least to a certain accuracy. This behavior may be demonstrated by looking also on the bit error ratio. For example, FIG. 6 illustrates a graph 600 depicting bit error ratio (BER) versus OSNR in a setup with 65 km single-mode optical fiber (SMF), according to an example. As shown, increasing the launchpower may be interpreted as moving to higher OSNR until the original OSNR is reached. Increasing the signal power to even higher levels may be apparently uncritical when only taking the ITU-T method into account.

It should be appreciated that exceeding the threshold power level may lead to a reversal in OSNR and simultaneously decreasing the bit-error ratio. However, this may be for generalized OSNR, including all kind of noise contributions, which may be different to the ITU-T measured OSNR but is directly accessible with the correlation method included in the OSCA. Other various examples or alternatives may also be provided.

Figure 7:
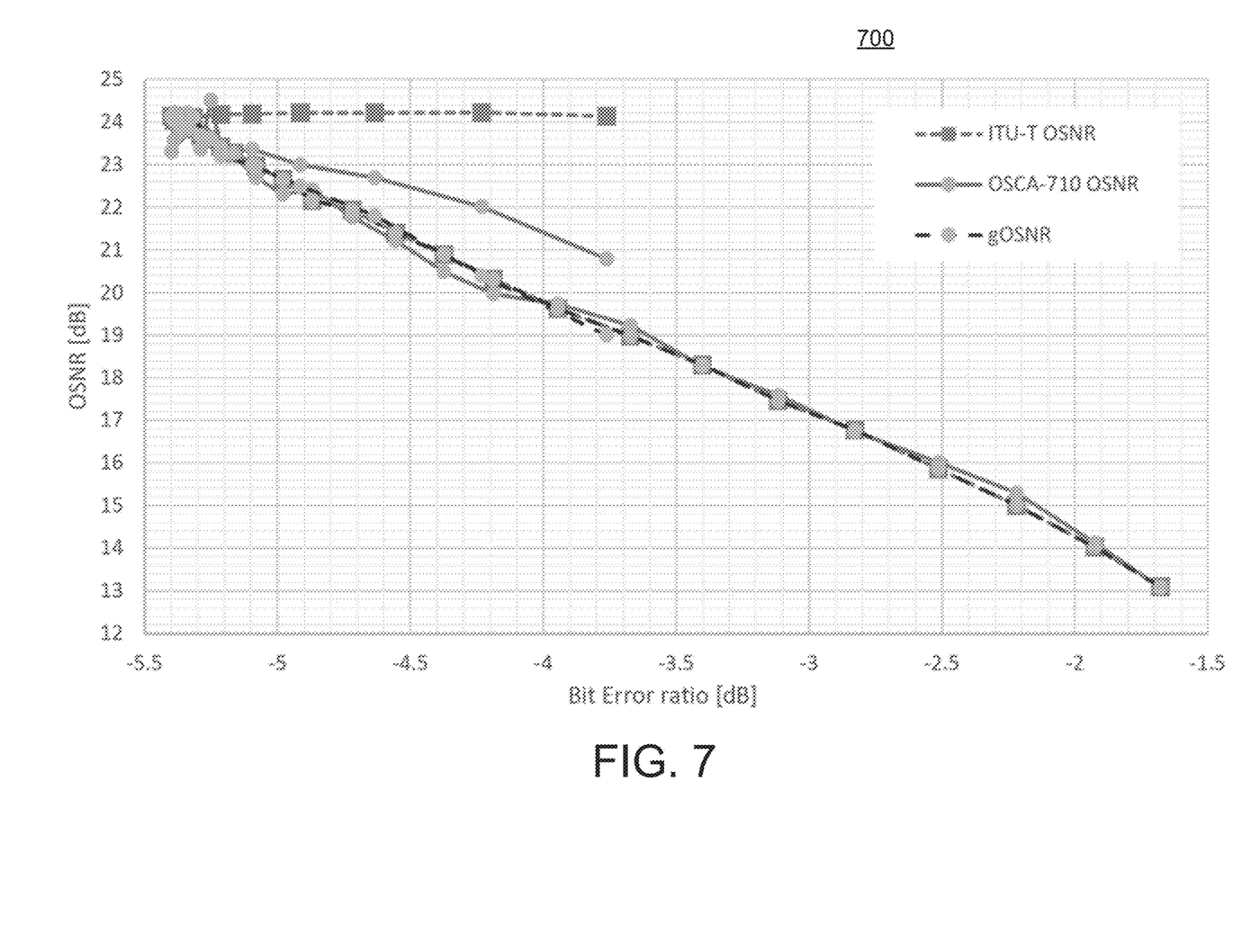
FIG. 7 illustrates a graph depicting optical signal-to-noise ratio (OSNR) versus bit error ration (BER) in a setup with 65 km single-mode optical fiber (SMF), according to an example.

FIG. 7 illustrates a graph 700 depicting OSNR versus bit error ratio (BER) in a setup with 65 km single-mode optical fiber (SMF), according to an example. By swapping x- and y-axes, an OSNR value dependent on the bit error ratio may be achieved, as shown, which may be misleading using a normal optical spectrum analyzer in the non-linear regime.

Figure 8:
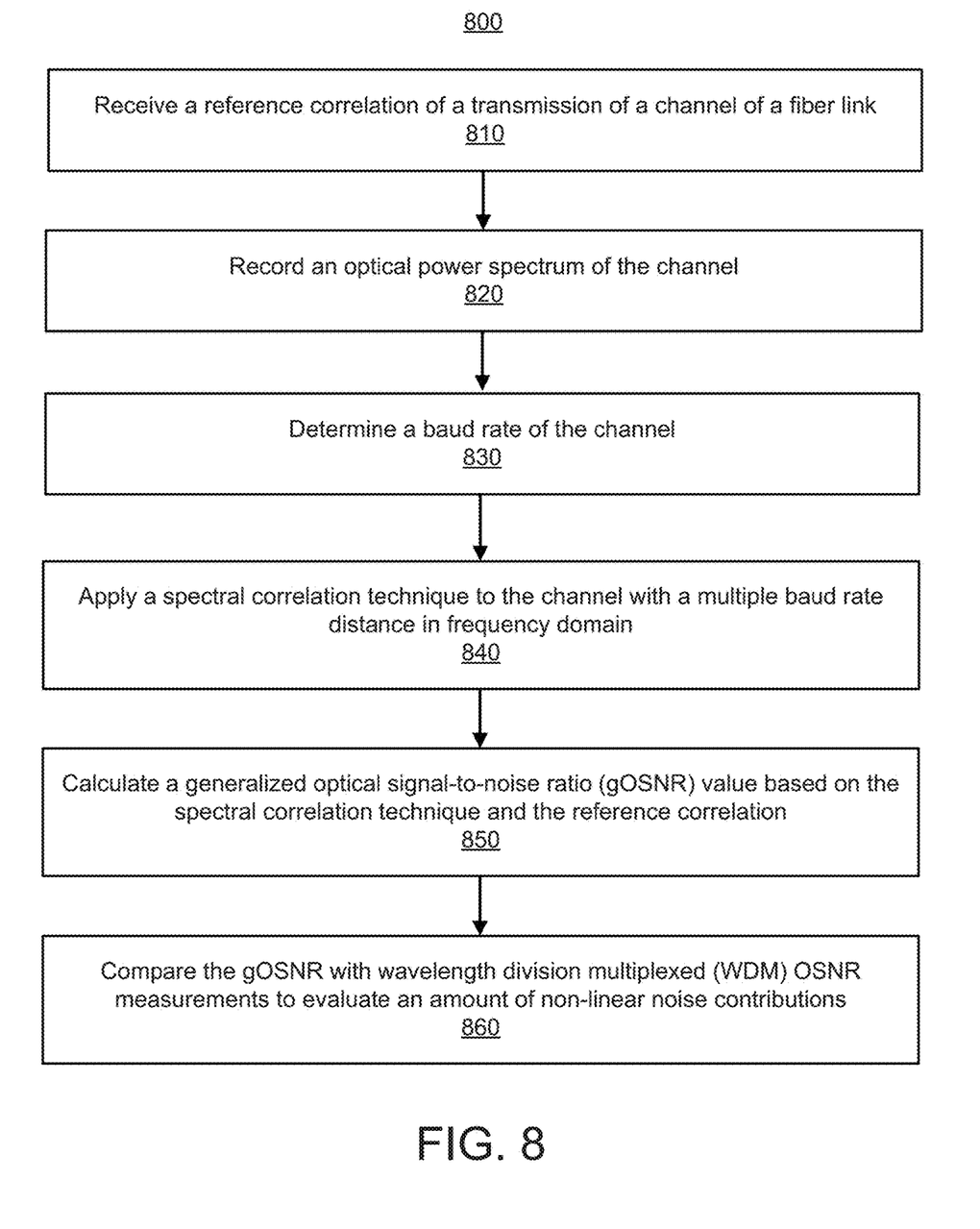
FIG. 8 illustrates a flow chart of a method for performing linear and non-linear transmission perturbations measurements in optical transmission systems, according to an example.

FIG. 8 illustrates a flow chart of a method 800 for performing linear and non-linear transmission perturbations measurements in optical transmission systems, according to an example. The method 800 is provided by way of example, as there may be a variety of ways to carry out the method described herein. Although the method 800 is primarily described as being performed by the system 100 of FIG. 1, respectively, the method 800 may be executed or otherwise performed by one or more processing components of another system or a combination of systems. Each block shown in FIG. 8 may further represent one or more processes, methods, or subroutines, and one or more of the blocks may include machine readable instructions stored on a non-transitory computer readable medium and executed by a processor or other type of processing circuit to perform one or more operations described herein.

The method may include, but not limited to, the following actions:

- Measure or receive, at 810, a reference correlation of a transmission of a channel of a fiber link (or get the value from vendor (third party system) or link operator);
- Record, at 820, an optical power spectrum of the channel under investigation at point of interest on the fiber link;
- Determine/guess/scan, at 830, a baud rate of the channel (e.g., 32 GBaud for 100 Gbit PM-QPSK);
- Apply, at 840, a spectral correlation technique. This may be achieved, for example, by probing two frequency components of the channel or by applying a spectral correlation technique to the channel with a multiple baud rate distance in frequency domain (e.g., 32 GHz⇔32 GBaud);
- Calculate, at 850, a gOSNR value based on the spectral correlation technique and the reference correlation; and
- Compare, at 860, the gOSNR with wavelength division multiplexed (WDM) OSNR measurements to evaluate an amount of non-linear noise contributions.

While examples described herein are directed to configurations as shown, it should be appreciated that any of the components described herein may be altered, changed, replaced, or modified, in size, shape, and numbers, or material, depending on application or use case, and adjusted for desired measurements of linear and non-linear transmission perturbations in optical transmission systems.

It should also be appreciated that the systems and methods, as described herein, may also include or communicate with other components not shown. For example, these may include external processors, counters, analyzers, computing devices, and other measuring devices or systems. This may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the back-end to facilitate the features and functionalities of the testing and measurement system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the systems and methods, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the systems described herein and/or run one or more application that utilize data from these systems or other communicatively coupled system.

The various components, circuits, elements, components, and interfaces, may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

Although examples are directed to test and measurement systems for measuring linear and non-linear transmission perturbations in optical transmission systems, it should be appreciated that that the systems and methods described herein may also be used in other various systems and other implementations. For example, the systems and methods may be used for spectral correlation in determining non-linear noise contributions and hence measuring generalized OSNR. The systems and methods described herein may also provide in-service opportunity to directly measure gOSNR on active links. Moreover, the techniques described herein may be used in not only in common test and measurement systems but also in highly non-linear regimes whereas common OSA-devices may fail due to incompatibility.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A test instrument, comprising:
a processor;
a memory, which when executed by the processor, measures non-linear noise at an optical transceiver, as follows:
receive a reference correlation of a transmission of a channel of a fiber link;
record an optical power spectrum of the channel;
determine a baud rate of the channel;
apply a spectral correlation technique to the channel with a multiple baud rate distance in frequency domain;
calculate a generalized optical signal-to-noise ratio (gOSNR) value based on the spectral correlation technique and the reference correlation; and
compare the gOSNR with wavelength division multiplexed (WDM) OSNR measurements to evaluate an amount of non-linear noise contributions.

2. The test instrument of claim 1, wherein the reference correlation is a value received from a third party system or a link operator.

3. The test instrument of claim 1, wherein the optical power spectrum of the channel is recorded from a point of interest on the fiber link.

4. The test instrument of claim 1, wherein the baud rate of the channel is determined based on at least one of a scan, estimate, or calculation.

5. The test instrument of claim 1, wherein the baud rate of the channel is 32 GBaud for a 100 Gbit PM-QPSK.

6. The test instrument of claim 1, wherein the spectral correlation technique comprises probing two frequency components of the channel.

7. A method, comprising:
   receiving, by a processor, a reference correlation of a transmission of a channel of a fiber link;
   recording an optical power spectrum of the channel;
   determining a baud rate of the channel;
   applying a spectral correlation technique to the channel with a multiple baud rate distance in frequency domain;
   calculating a generalized optical signal-to-noise ratio (gOSNR) value based on the spectral correlation technique and the reference correlation; and
   comparing the gOSNR with wavelength division multiplexed (WDM) OSNR measurements to evaluate an amount of non-linear noise contributions.

8. The method of claim 7, wherein the reference correlation is a value received from a third party system or a link operator.

9. The method of claim 7, wherein the optical power spectrum of the channel s recorded from a point of interest on the fiber link.

10. The method of claim 7, wherein the baud rate of the channel is determined based on at least one of a scan, estimate, or calculation.

11. The method of claim 7, wherein the baud rate of the channel is 32 GBaud for a 100 Gbit PM-QPSK.

12. The method of claim 7, wherein the spectral correlation technique comprises probing two frequency components of the channel.

13. A non-transitory computer-readable storage medium having an executable stored thereon, which when executed instructs a processor to perform the following:
   receive a reference correlation of a transmission of a channel of a fiber link;
   record an optical power spectrum of the channel;
   determining a baud rate of the channel;
   applying a spectral correlation technique to the channel with a multiple baud rate distance in frequency domain;
   calculating a generalized optical signal-to-noise ratio (gOSNR) value based on the spectral correlation technique and the reference correlation; and
   comparing the gOSNR with wavelength division multiplexed (WDM) OSNR measurements to evaluate an amount of non-linear noise contributions.

14. The non-transitory computer-readable storage medium of claim 13, wherein the reference correlation is a value received from a third party system or a link operator.

15. The non-transitory computer-readable storage medium of claim 13, wherein the optical power spectrum of the channel is recorded from a point of interest on the fiber link.

16. The non-transitory computer-readable storage medium of claim 13, wherein the baud rate of the channel is determined based on at least one of a scan, estimate, or calculation.

17. The non-transitory computer-readable storage medium of claim 13, wherein the baud rate of the channel is 32 GBaud for a 100 Gbit PM-QPSK.

18. The non-transitory computer-readable storage medium of claim 13, wherein the spectral correlation technique comprises probing two frequency components of the channel.

* * * * *